(12) United States Patent
Di Pietro et al.

(10) Patent No.: US 11,150,671 B2
(45) Date of Patent: Oct. 19, 2021

(54) METHOD AND SYSTEM FOR JAMMING LOCALIZATION AND SUPPORTING NAVIGATION SYSTEM

(71) Applicant: Qatar Foundation for Education, Science and Community Development, Doha (QA)

(72) Inventors: Roberto Di Pietro, Doha (QA); Gabriele Oligeri, Doha (QA); Pietro Tedeschi, Doha (QA)

(73) Assignee: Qatar Foundation for Education, Science and Community Development, Doha (QA)

( * ) Notice: Subject to any disclaimer, the term of this patent is extended or adjusted under 35 U.S.C. 154(b) by 406 days.

(21) Appl. No.: 16/405,489

(22) Filed: May 7, 2019

(65) Prior Publication Data

US 2021/0018936 A1    Jan. 21, 2021

(51) Int. Cl.
| | | |
|---|---|---|
| G05D 1/10 | (2006.01) | |
| H04K 3/00 | (2006.01) | |
| B64C 39/02 | (2006.01) | |
| G01C 21/20 | (2006.01) | |

(52) U.S. Cl.
CPC ........... *G05D 1/106* (2019.05); *B64C 39/024* (2013.01); *G01C 21/20* (2013.01); *H04K 3/22* (2013.01); *H04K 3/90* (2013.01); *H04K 2203/22* (2013.01)

(58) Field of Classification Search
CPC .................................................... G05D 1/106
See application file for complete search history.

(56) References Cited

U.S. PATENT DOCUMENTS

| | | | |
|---|---|---|---|
| 6,710,739 B1* | 3/2004 | Loegering | G01S 19/21 342/357.31 |
| 8,442,791 B2 | 5/2013 | Stahlin | |
| 10,044,465 B1* | 8/2018 | Hetsko | G08G 5/0026 |
| 10,470,129 B2* | 11/2019 | Raghupathy | G01S 5/0236 |
| 10,608,777 B2* | 3/2020 | Ju | H04L 27/2647 |
| 2014/0236396 A1* | 8/2014 | Gheorghe | G05B 23/0243 701/3 |

(Continued)

FOREIGN PATENT DOCUMENTS

| | | |
|---|---|---|
| CA | 2934755 A1 | 6/2016 |
| EP | 2846174 A1 | 3/2015 |

(Continued)

*Primary Examiner* — Alex C Dunn
(74) *Attorney, Agent, or Firm* — K&L Gates LLP (57) ABSTRACT

The presently disclosed method and system exploits a received signal strength of a jamming signal emitted by a jammer to allow navigation of an object through an area containing the jamming signal. In one embodiment, the method comprises receiving a plurality of navigation data and a jamming signal when entering a jamming zone. The method then comprises repeatedly measuring the strength of the jamming signal while moving within the jamming zone. The method then comprises determining the location of the jammer based on the movement within the jamming zone and the strength of the jamming signal at multiple coordinates. The method further comprises performing movement to destination coordinates within the jamming zone at least partially based on the jammer location and the strength of the jamming signal.

20 Claims, 6 Drawing Sheets

(56) References Cited

U.S. PATENT DOCUMENTS

| | | | |
|---|---|---|---|
| 2015/0331099 A1* | 11/2015 | Wu | G08G 5/0008 |
| | | | 342/32 |
| 2016/0261990 A1* | 9/2016 | Zimmermann | H04W 64/006 |
| 2018/0317232 A1* | 11/2018 | Kumar | H04W 24/10 |
| 2019/0181974 A1* | 6/2019 | Ju | H04L 27/2626 |
| 2019/0244524 A1* | 8/2019 | Tanaka | G05D 1/0214 |
| 2020/0119822 A1* | 4/2020 | Li | H04L 5/0057 |
| 2021/0014690 A1* | 1/2021 | Ljung | H04L 43/06 |
| 2021/0067292 A1* | 3/2021 | Liu | H04L 5/0053 |
| 2021/0099264 A1* | 4/2021 | Liu | H04L 5/0048 |

FOREIGN PATENT DOCUMENTS

| | | |
|---|---|---|
| GB | 2521246 A | 6/2015 |
| WO | 2012105752 A2 | 8/2012 |

\* cited by examiner

METHOD AND SYSTEM FOR JAMMING LOCALIZATION AND SUPPORTING NAVIGATION SYSTEM

BACKGROUND

Aerial vehicles, like Unmanned Ariel Vehicles ("UAVs"), are typically remote-controlled via the standard Wi-Fi bands: 2.4 GHz and 5 GHz. Through its navigation system, a UAV, or other remote controlled vehicles, receive navigation data comprising a current coordinate of the vehicle and instructions detailing the movements the vehicle should take. These instructions can include a destination coordinate, and a series of other coordinates, creating a path, that the vehicle should take to reach the destination coordinate. These UAVs are becoming more popular due to their low cost, widespread availability, and the wide range of applications for which such vehicles can be deployed. Several examples of these applications include military use, police use, delivery services, monitoring and reconnaissance, commercial uses including photography and videography, and many more.

Though UAVs are useful for many applications, there are instances in which the presence of these UAVs is not welcomed. One example of these instances is when there exists a no-fly zone, within which a third party may wish to prevent navigation of any UAVs. In these situations, the third party may make use of any number of multiple countermeasures. One of the most efficient, effective, and popular countermeasures is radio signal jamming. Jamming is the act of preventing radio communications by decreasing the Software to Noise Ratio ("SNR") to make the anticipated navigation signal indistinguishable from the noise produced by a jammer. Typically, jamming is carried out by transmitting a jamming signal at the same frequency of the signal to be disturbed, 2.4 GHz or 5 GHz in case of UAVs. By decreasing the SNR to a level in which the jamming signal noise and anticipated navigation signal are indistinguishable to a UAV's typical navigation system, the third party effectively prevents the UAV from completing its mission by inhibiting the remote controlling functions and/or preventing the UAV from receiving the coordinates of a GPS signal. Therefore, this jamming countermeasure prohibits a UAV from navigating within a jamming zone containing a jamming signal.

Some partial solutions for navigating a UAV within a jamming zone have been introduced, but these solutions rely on the use of a camera attached to the UAV and processing of images produced by the camera, including performing object recognition in search of landmarks, or require additional modifications to the underlying hardware navigation components. One problem with this prior solution is the reliance on the use of a camera. In some situations, a camera may be disallowed due to local regulations, or the camera may become disabled or malfunction during the course of a mission, rendering the solution useless. Other existing solutions to leverage jamming attacks are based on schemes where the position, power transmission, and other attributes of the jammer are already known. The problem with such a solution is that when the system does not already know the attributes of a jammer, such as when encountering non-friendly jammers, the solution is completely ineffective. Therefore, a need exists for a method and system that allows a UAV, or any other remote controlled vehicle, to navigate within a jamming zone without the use of a camera system, further extensive modifications to an existing navigation system, or the requirement that the jammer attributes are already known. Such a solution must be able to perform this act based only on the exploitation of the received signal strength ("RSS") of the radio frequency signal emitted by a jammer.

BRIEF SUMMARY OF THE INVENTION

The presently described method and system is a method and system for navigating an object within an area in which typical navigation technologies are not functional due to a jamming signal. The system and method allows an object to reach particular coordinates or waypoints within a jamming zone by receiving the jamming signal, measuring the signal strength of the jamming signal, moving the object in a path along which the signal strength remains constant, determining the location of the jammer based on the path taken and corresponding RSS measurements, and using the jammer location, in combination with other known coordinates and continuing RSS measurements, to navigate to the particular coordinates within the jamming zone.

In light of the disclosures herein, and without limiting the scope of the invention in any way, in a first aspect of the present disclosure, which may be combined with any other aspect listed herein unless specified otherwise, a method is provided comprising receiving a first plurality navigation data. The method further comprises performing movement into a jamming zone based on the first plurality of navigation data. The method also comprises receiving a jamming signal, employed by a jammer, located within the jamming zone. The method comprises measuring a received signal strength of the jamming signal. The method further comprises performing movement based at least partially on the received signal strength. The method also comprises repeatedly measuring the received signal strength and performing moving based on the received signal, a first time, to determine a jammer location based on a plurality of received signal strength measurements and a second plurality of navigation data. The method also comprises repeatedly measuring the received signal strength and performing moving based on the received signal, a second time, to perform movement within the jamming zone, based at least partially on the jammer location, the received signal strength, and the first plurality of navigation data.

In a second aspect of the present disclosure, which may be combined with any other aspect listed herein unless specified otherwise, repeatedly measuring the received signal strength and performing movement occurs after the first time the method repeatedly measures the received signal strength and performs movement In a third aspect of the present disclosure, which may be combined with any other aspect listed herein unless specified otherwise, the first plurality of navigation data comprises a current object coordinate and a movement instruction set comprising at least one destination coordinate.

In a fourth aspect of the present disclosure, which may be combined with any other aspect listed herein unless specified otherwise, the movement instruction set comprises at least one destination coordinate within the jamming zone.

In a fifth aspect of the present disclosure, which may be combined with any other aspect listed herein unless specified otherwise, predicting a next coordinate at which the received signal strength equals a threshold signal strength, determining a first path of movement to arrive at the next coordinate from the current object coordinate, and performing movement along the path of movement.

In a sixth aspect of the present disclosure, which may be combined with any other aspect listed herein unless specified otherwise, the second plurality of navigation data comprises a plurality of power threshold coordinates at which the received signal strength was equal to the threshold signal strength.

In a seventh aspect of the present disclosure, which may be combined with any other aspect listed herein unless specified otherwise, the path of movement is substantially circular in shape.

In an eighth aspect of the present disclosure, which may be combined with any other aspect listed herein unless specified otherwise, to determine a jammer location based on a plurality of received signal strength measurements and a second plurality of navigation data comprises applying a curve fitting algorithm based on the plurality of power threshold coordinates.

In a ninth aspect of the present disclosure, which may be combined with any other aspect listed herein unless specified otherwise, repeatedly measuring the received signal strength and performing moving based on the received signal, a second time, to perform movement within the jamming zone, based at least partially on the jammer location, the received signal strength, and the first plurality of navigation data comprises determining an estimated current object coordinate at least partially based on the received signal strength of the jamming signal and the jammer location, determining a next destination coordinate from the at least one destination coordinate within the jamming zone, determining a second path of movement from the estimated current object coordinate to the next destination coordinate, and performing movement, based at least partially on the second path of movement.

In a tenth aspect of the present disclosure, which may be combined with any other aspect listed herein unless specified otherwise, the movement instruction set comprises at least two destination coordinates within the jamming zone.

In an eleventh aspect of the present disclosure, which may be combined with any other aspect listed herein unless specified otherwise, the flight path comprises instructions to reach each of the at least two destination coordinates only once.

In a twelfth aspect of the present disclosure, which may be combined with any other aspect listed herein unless specified otherwise, the method further comprises determining a current movement speed of the object at least partially based on the jammer location and the received signal strength.

In a thirteenth aspect of the present disclosure, which may be combined with any other aspect listed herein unless specified otherwise, the method further comprises depositing a payload at any of the at least one destination coordinates within the jamming zone.

In a fourteenth aspect of the present disclosure, which may be combined with any other aspect listed herein unless specified otherwise, a positioning system comprises an external data source configured to transmit a first plurality of navigation data, a jammer configured to transmit a jamming signal within a jamming zone, and an object. The object comprises an antenna configured to receive the first plurality of navigation data and the jamming signal and to relay the first plurality of navigation data and the jamming signal. The object further comprises a navigation system configured to receive the first plurality of navigation data from the antenna; and provide a first set of movement instructions, based on the first plurality of navigation data, into a jamming zone. The object also comprises a navigation support system configured to receive the first plurality of navigation data and the jamming signal, provide a second set of instructions to perform movement, based at least partially on the received signal strength repeat the act of receiving the jamming signal and providing a second set of instructions to perform movement, a first time, to determine a jammer location based on a plurality of received signal strength measurements and a second plurality of navigation data, and repeat the act of receiving the jamming signal and providing a second set of instructions to perform movement, a second time, within the jamming zone, based at least partially on the jammer location, the received signal strength, and the first plurality of navigation data. The object further comprises a propulsion system configured to receive any of the sets of instructions to perform movement provided by the navigation system and the navigation support system, and perform movement based on any of the sets of instructions to perform movement.

In a fifteenth aspect of the present disclosure, which may be combined with any other aspect listed herein unless specified otherwise, the first plurality of navigation data comprises a current object coordinate and a movement instruction set comprising at least one destination coordinate.

In a sixteenth aspect of the present disclosure, which may be combined with any other aspect listed herein unless specified otherwise, providing a second set of instructions to perform movement comprises predicting a next coordinate at which the received signal strength equals a threshold signal strength, determining a path of movement to arrive at the next coordinate from the current object coordinate, and providing instruction to perform movement along the path of movement.

In a seventeenth aspect of the present disclosure, which may be combined with any other aspect listed herein unless specified otherwise, the second plurality of navigation data comprises a plurality of power threshold coordinates at which the received signal strength was equal to the threshold signal strength.

In an eighteenth aspect of the present disclosure, which may be combined with any other aspect listed herein unless specified otherwise, the path of movement is substantially circular in shape.

In a nineteenth aspect of the present disclosure, which may be combined with any other aspect listed herein unless specified otherwise, to determine a jammer location based on a plurality of received signal strength measurements and a second plurality of navigation data comprises using the plurality of power threshold coordinates as inputs to a curve fitting algorithm.

In a twentieth aspect of the present disclosure, which may be combined with any other aspect listed herein unless specified otherwise, a non-transitory, computer-readable medium storing instructions which, when performed by a processor, may cause the processor to receive, receive a first plurality navigation data. The processor may further provide instruction provide a first set of movement instructions to perform movement into a jamming zone based on the first plurality of navigation data. The processor may then receive a jamming signal, employed by a jammer, located within the jamming zone. The processor may also measure a received signal strength of the jamming signal. The processor may further provide a second set of movement instructions to perform movement based at least partially on the received signal strength. The processor can also repeatedly, a first time, measure the received signal strength and provide instruction to perform movement based on the received signal to determine a jammer location based on a plurality of received signal strength measurements and a second plurality of navigation data. The processor can also repeatedly, a second time, measure the received signal strength and provide instruction to perform movement to provide a second set of movement instructions to perform movement within the jamming zone, based at least partially on the jammer location, the received signal strength, and the first plurality of navigation data.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

The popularity of remote controlled vehicles is increasing rapidly. These vehicles have proven useful for many services, both military and commercial. This usefulness, in combination with the low cost and widespread availability has led to a surge in the adoption of the vehicles, especially in regards to unmanned aerial vehicles ("UAVs").

As the use of this technology increases, the measures taken to prevent the access to certain locations by these remote controlled vehicles will become more prevalent. Though the use of remote-controlled vehicles can be beneficial to many, there may exist situations in which a third party attempts to prevent to access to a location by such vehicles. As such, this third party may take measures to remove the remote controlled vehicle's ability to navigate into and through this location.

Of the many measures that can be taken to exclude these vehicles, the most typical measure is the use of a jammer. These jammers counter remote controlled vehicles by transmitting strong, noisy signals via frequencies used by remote controlled vehicles to decrease the software to noise ratio ("SNR"). Because remote vehicles typically function on the Wi-Fi standard 2.4 GHz and 5 GHz frequencies, jammers will attack these same frequencies.

While under attack by this jamming signal, a remote controlled vehicle will no longer receive necessary navigation data including the vehicles current coordinate, a destination coordinate, or a path to be taken between the two. Therefore, because the vehicle has lost these coordinates and destination coordinates, it will be ineffective in its mission, be it to navigate to a certain location, pass through certain waypoints, deliver a payload, take photographs or video, or any other activity requiring navigation within a jamming zone. This ineffectiveness nullifies the benefits of these remote controlled vehicles and poses a problem for the technology.

One innovative solution to this problem is to use the jamming signal, itself, to allow a remote controlled vehicle to navigate within the zone containing the jamming zone. For example, an antenna already used to receive navigation data, also receives the jamming signal by function. As such, this antenna passes along the navigation data to the navigation system, which typically controls all positioning and navigating functions. When receiving a jamming signal, within a jamming zone, a navigation support system can be employed to analyze this jamming signal to determine the received signal strength ("RSS") of the signal. Following this analysis, the navigation support system can then provide sets of movement instructions, interpreted by a vehicle, to navigate within the jamming zone in such a way as to collect multiple data points detailing power threshold coordinates in which the RSS is equivalent to a threshold signal strength. Using this dataset, the navigation support system can determine the location of the jammer. One way to determine the location of the jammer is to use the dataset of power threshold coordinates within a curve-fitting algorithm. Once the location of the jammer is known, the navigation support system can continue to analyze the RSS of the jamming signal and, in conjunction with the use of known signal propagation attributes, determine a predicted position of the vehicle, even when the SNR within the jamming zone is too little to allow the navigation system to determine position from the navigation data received from the external data source. Although the navigation system and navigation support system are described above as two separate components, in certain embodiments, the navigation support system and navigation system may be one and the same.

Such a system effectively allows a remote controlled vehicle to operate within a jamming zone, thereby nullifying the usefulness of jammers and increasing the effectiveness of remote vehicle technology.

Figure 1:
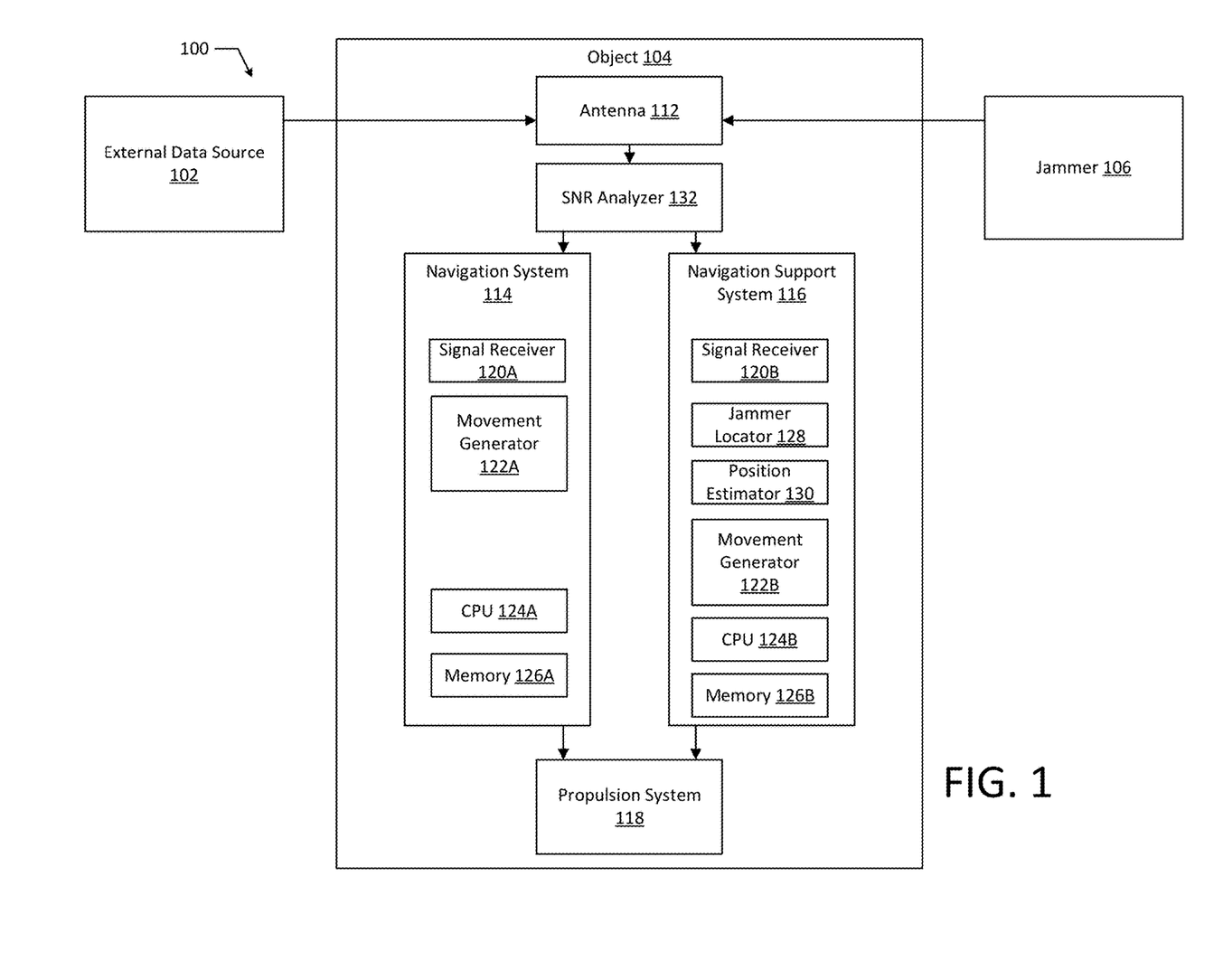
FIG. 1 illustrates an example embodiment of a system of the present disclosure.

FIG. 1 depicts a system 100 according to an exemplary embodiment of the present disclosure. The system 100 includes the object 104, the external data source 102, and a jammer 106. The external data source 102 may include a satellite, an antenna tower, or any other object configured to relay navigation data to the object 104. The external data source 102 may be configured to relay data to object 104, which may include a current object coordinate of the vehicle and movement instruction set comprising at least one destination coordinate. The jammer 106 may be configured to produce a jamming signal to be received by object 104 when the object 104 enters a jamming zone. The object 104 may include a drone, an aircraft, a car, a truck, a submarine, or any other object that relies on navigation data, such as GPS, to navigate to any number of destination coordinates. The object 104 may be configured to receive the navigation data from the external data source 102 and jamming signal from the jammer 106.

The object 104 may include an antenna 112, a navigation system 114, a navigation support system 116, an SNR Analyzer 132, and a propulsion system 118. The antenna 112 may be configured to receive navigation data from the external data source 102 and the jammer 106. The antenna 112 may be further configured to relay the navigation data from the external data source 102 and the jammer 106 to the navigation system 114 and the navigation support system 116.

The navigation system 114 may be configured to include a signal receiver 120A, a movement generator 122A, a CPU 124A, and a memory 126A. The signal receiver 120A may be configured to receive the navigation data and the jamming signal from the antenna 112. The movement generator 122A may be configured to interpret the signal received by signal receiver 120A and generate a set of movement instructions. The set of movement instructions configured by the movement generator may include instructions to move to a destination coordinate along a determined path. The movement generator 122A may be further configured to provide the set of movement instructions to the propulsion system 118. The CPU 124A and the memory 126A may implement one or more of the navigation system 114 features, such as the signal receiver 120A and/or the movement generator 122A. For example, the memory 126A may contain instructions which, when executed by the CPU 124A may perform one or more of the operational features of the navigation system 114.

The navigation support system 116 may be configured to include a signal receiver 120B, a jammer locator 128, a position estimator 130, a movement generator 122B, a CPU 124B, and a memory 126B. The signal receiver 120B may be configured to receive the navigation data from the external data source and the jamming signal from the antenna 112. The jammer locator 128 may be configured to analyze the jamming signal, including measuring the RSS of the jamming signal. The jammer locator 128 may be further configured to interpret a compiled set of coordinates and related jamming signal RSS to determine a plurality of power threshold coordinates. The jammer locator 128 may use these power threshold coordinates may be the location of the jammer 106, for example by using a curve-fitting algorithm. The position estimator 130 may be configured to interpret the jamming signal RSS and the location of the jammer 106 to estimate a current position of object 104 regardless of the SNR of the navigation data received from the antenna 112. The movement generator 122B may be configured to interpret the estimated position of the object 104 and the destination coordinates to generate a set of movement instructions. The set of movement instructions configured by the movement generator may include instructions to move to a specified coordinate along a determined path within the jamming zone. The movement generator 122B may be further configured to provide the set of movement instructions to the propulsion system 118. The CPU 124B and the memory 126B may implement one or more of the navigation support system 116 features, such as the signal receiver 120B and/or the movement generator 122B. For example, the memory 126B may contain instructions which, when executed by the CPU 124B may perform one or more of the operational features of the navigation support system 116. The propulsion system 118 may include a land-based vehicle's engine, steering mechanisms, and tires, an aircraft's wings, engine, and steering object, or any combination of components by which a vehicle executes movement from one position to the next.

Though FIG. 1 displays the navigation system 114 and navigation support system 116 as two separate systems, an embodiment of the present disclosure combines the two systems into one.

Figure 2:
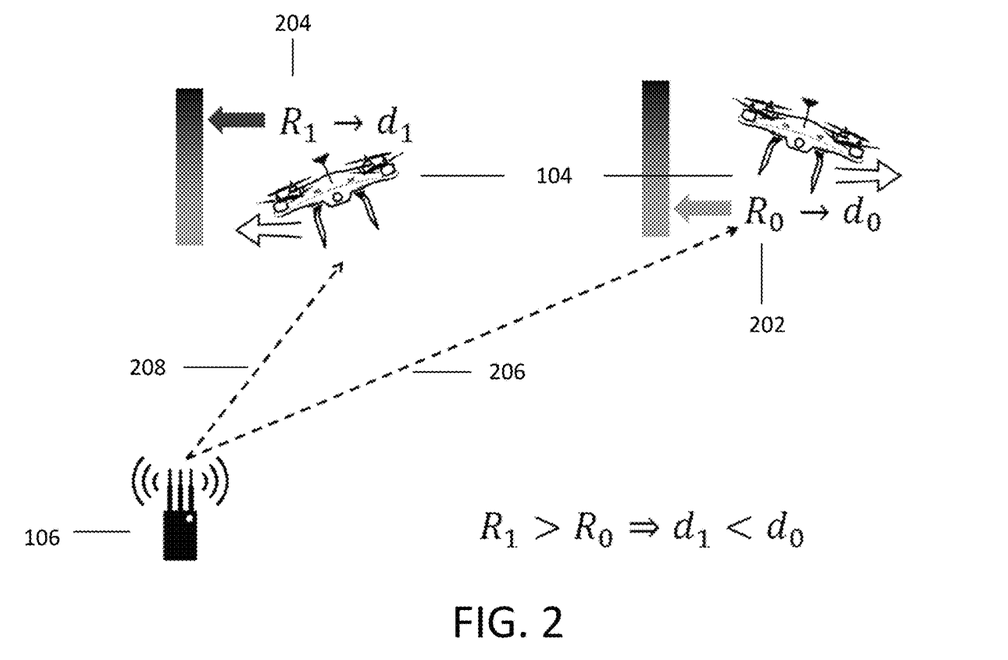
FIG. 2 illustrates the relationship between a distance to a jammer and the received signal strength of the jammer.

FIG. 2 depicts an example of the relationship between the RSS and a distance to the jammer 106. In discussing FIG. 2, reference will be made to the example system of FIG. 1. When the object 104 enters a jamming zone, the antenna 112 may receive a jamming signal and pass this signal along to the navigation support system 116. The signal receiver 120B may receive this signal and pass it along to the jammer locator 128. The jammer locator 128 may then analyze this signal to measure a first RSS, $R_0$ 202. When the object 104 has moved to a different coordinate, the jammer locator 128 may receive a second RSS, $R_1$ 204, through a substantially similar process. The jammer locator 128 may then compare the first RSS 202 to the second RSS 204. By way of known signal propagation properties, if the first RSS 202 is less than the second RSS, 204, the distance from the object 104 to the jammer 106 at which the first RSS 202 was measured, $d_0$ 206, is greater than the distance from the object 104 to the jammer 106 at which the second RSS 204 was measured, $d_1$ 208.

Figure 3:
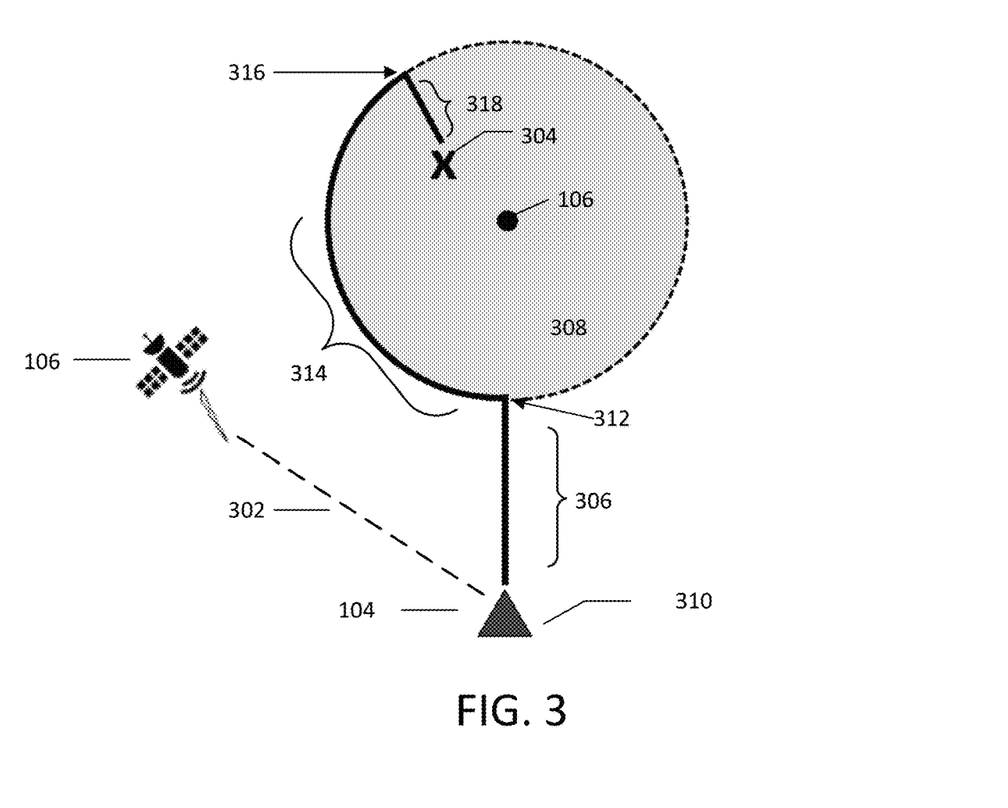
FIG. 3 illustrates an example path taken by an object in the system of the present disclosure.

FIG. 3 depicts an example path taken by the object 104 in an embodiment of the present disclosure. In discussing FIG. 3, reference will be made to the example system of FIG. 1. To begin, the external data source, 106, may relay a navigation data 302 to object 104. In an embodiment, the navigation data 302 may contain instructions to navigate to a specific destination coordinate 304. The object 104 may receive this signal by way of antenna 112. The navigation data 302 will be relayed, by the antenna 112, to the SNR Analyzer 132. The SNR analyzer may then analyze the received navigation data 112 to determine whether a jamming signal has been received in conjunction with the original navigation data 302. In original position 310, there is no jamming signal. Thus, the SNR analyzer 132 may pass along the navigation data 302 to the navigation system 114 and navigation support system 116 with no indication of the presence of a jamming signal. Because there is no jamming signal present at the original position 310, the navigation system 114 may control movement of the object 104. The signal receiver 120A of the navigation system 114 may receive the navigation data 302 from the SNR analyzer 132. The movement generator 122A may then interpret this signal to determine a path object 104 should take to reach the destination coordinate 304. In FIG. 3, the movement generator has determined the path 306 is a portion of the optimum path to the destination coordinate 304. After determining this path 306, the movement generator 122A may generate a set of movement instructions along this path 306, and provide the instructions to the propulsion system 118.

The prolusion system 118 may then propel the object 104 along path 306. Along this path 306, the antenna 112 and SNR analyzer 132 receive and analyze, respectively, the navigation data 302, determining whether the SNR has fallen below a certain threshold. The object 104 continues along the path until the vehicle reaches coordinate 310. At coordinate 312, the SNR analyzer 132 may determine that the SNR has fallen below a specified value, indicating the presence of a jamming signal 308. In an example embodiment, the threshold SNR value is not low enough to completely remove the ability of object 104, through its components, to determine a current vehicle position.

Once the jamming signal 308 has been detected by the SNR analyzer 132, the navigation support system may receive both the navigation data 302 and jamming signal 308, through signal receiver 120B. The jammer locator 128 may then analyze the signals. The jammer locator 128 may measure the RSS of the jamming signal 308. The jammer locator 128 may further determine whether the RSS of the jamming signal 308 has crossed a pre-fixed threshold. In the example of FIG. 3, this threshold is met at coordinate 312 as well.

While analyzing the jamming signal 308, the position estimator 130 may interpret the navigation data 302 to determine a current object coordinate of the object 104. In FIG. 3, at coordinate 312, the SNR is not so low as to prevent the position estimator from accurately determining the vehicle's 104 position from the navigation data 302, alone. Though the SNR threshold and RSS threshold are both met at the same coordinate in the example of FIG. 3, the SNR analyzer 132 may determine the presence of a jammer 106 before the RSS threshold is met. In that case, the movement generator 122B would provide instructions to continue along the optimum path 306 until the RSS threshold is met.

Once the threshold for the RSS has been met, the movement generator 122B will determine a set of movement instructions to follow a path to maintain the RSS at the threshold value, allowing accurate reception of current object coordinates from the navigation data 302. In FIG. 3, the movement generator 122B has determined the jamming path 314 will maintain the RSS at the threshold. Note, that while the jamming path 314 appears circular in FIG. 3, other embodiments of the disclosure may allow for a differently shaped path. The movement generator 122B may provide this set of movement instructions to the propulsion system 118. The propulsion system 118 may then propel the object 104 along the jamming path 314.

While the propulsion system 118 executes the movement set, the antenna 112, SNR analyzer 132, jammer locator 128, position estimator 130, and movement generator 122B may continue to function. As the object 104 propels along the jamming path 314, the jammer locator 128 can log vehicle coordinates as estimated by the position estimator 130 in correspondence with the measured RSS at those coordinates. Also, the movement generator 122B may update the movement instructions set provided to the propulsion system 118 as more coordinates and RSS measurements are received.

After the jammer locator 128 has logged a sufficiently large dataset containing coordinates and related RSS values, the jammer locator 128 may provide the dataset, as inputs, to a curve-fitting algorithm. Through the use of the curve-fitting algorithm, or any other similar algorithm substantially aimed towards accomplishing the same goal, the jammer locator 128 can estimate location of the jammer 106. This estimated jammer location may then be exploited as a landmark for the navigation support system, allowing the vehicle to move towards a destination coordinate 304, even when the SNR is too low to allow sufficient current object coordinates data to be interpreted from the navigation data 302.

In FIG. 3, the jammer locator 128 has determined the location of the jammer 106, at least when the object 104 reaches coordinate 316. Note that the object 104 may continue along a circular path on which the RSS remains constant even after the jammer 106 has been located. As such, the movement generator 122B will generate a set of movement instructions along a path 318 to reach the destination coordinate 304 and provide this set of instructions to the propulsion system 118. While the object 104 moves along path 318, the position estimator 130 and jammer locator 128 may continue to function. The jammer locator 128 may continue to analyze and measure the RSS of the jamming signal 308 and provide this measurement to the position estimator 130. The position estimator 130 may use a combination of the known information including, the known position data outside the zone containing the jamming signal 308, the location of the jammer 106 as a landmark, and the RSS measurements received. Using this information in combination with known generic radio propagation models, the position estimator can determine an estimated current object coordinate for the object 104, allowing traversal within a zone containing the jamming signal 308. The object 104 may then move through the jamming zone to reach the destination coordinate 304.

Figure 4:
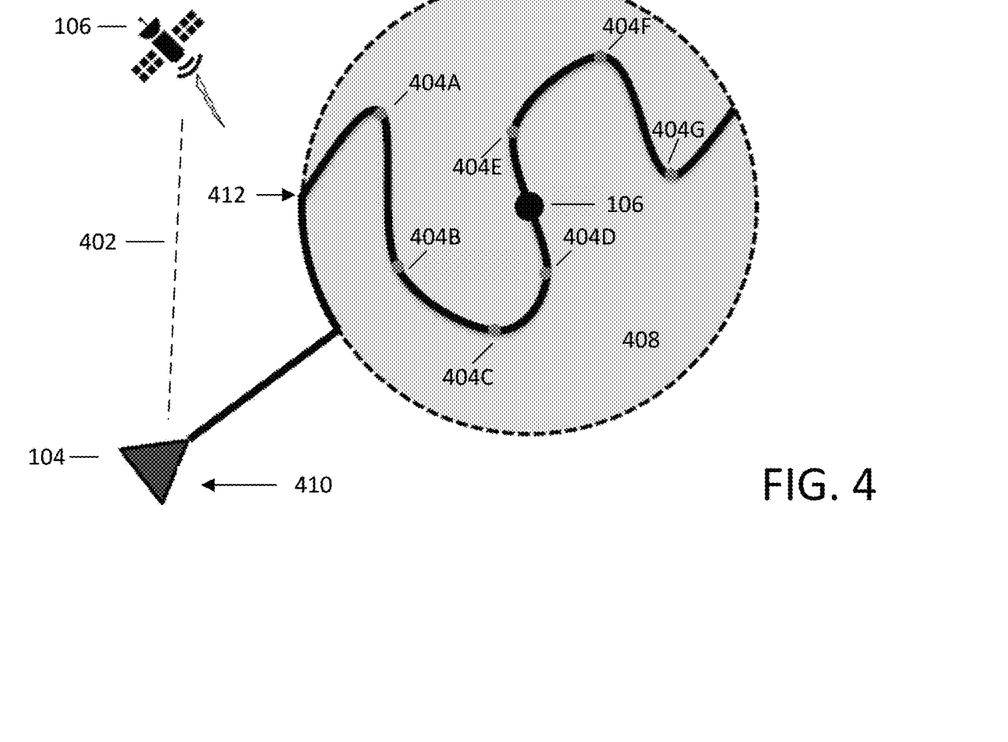
FIG. 4 illustrates an example path taken by an object in the system of the present disclosure.

The remote controlled vehicle system 100 can also be used for aerial recognition. FIG. 4 depicts a use case of system 100 in one such manner. To begin, the operation of system 100 proceeds in substantially the same manner as that of the operation described above regarding FIG. 3. In one example of operation, the navigation data 402 may include multiple destination coordinates, or waypoints 404A-G, and may even include instruction to discover and navigate to the jammer 106 if it is known there is the presence of one such jammer.

In one embodiment, the object 104 will proceed in a similar manner to that described regarding FIG. 3 until the object 104 reaches coordinate 412. At this coordinate, the jammer 106 has been located by the jammer locator 128. Unlike in the embodiment described in FIG. 3, the vehicle must move through multiple waypoints 404A-G within the jamming zone 408. The movement generator 122B may determine a path from coordinate 412 that reaches each of the waypoints 404A-G. Though in the current embodiment, the path determined by the movement generator 122B passes through each waypoint 404A-404G only once, another embodiment allows for the vehicle to navigate to any combination of the waypoints 404A-404G and the jammer 106 any number of times. While the object 104 moves along the path, the position estimator 130 and jammer locator 128 may continue to function. The jammer locator 128 may continue to analyze the RSS of the jamming signal found in jamming zone 408 and provide this measurement to the position estimator 130. The position estimator 130 may use a combination of known information including, the known position data outside the jamming zone 408, the location of the jammer 106 as a landmark, and the RSS measurements received and communicated through the jammer locator 128. Using this information in combination with known generic radio propagation models, the position estimator 130 can determine a likely current coordinate for the object 104, allowing traversal within the jamming zone 408. Furthermore, the position estimator 130, using the same information described above, can determine a current move speed of the object 104. Therefore, the movement generator 122B can interpret the estimated position and speed data from the position estimator 130 to allow the object 104 to move through the jamming zone 408 to reach the waypoints 404A-G and the jammer 106.

Figure 5:
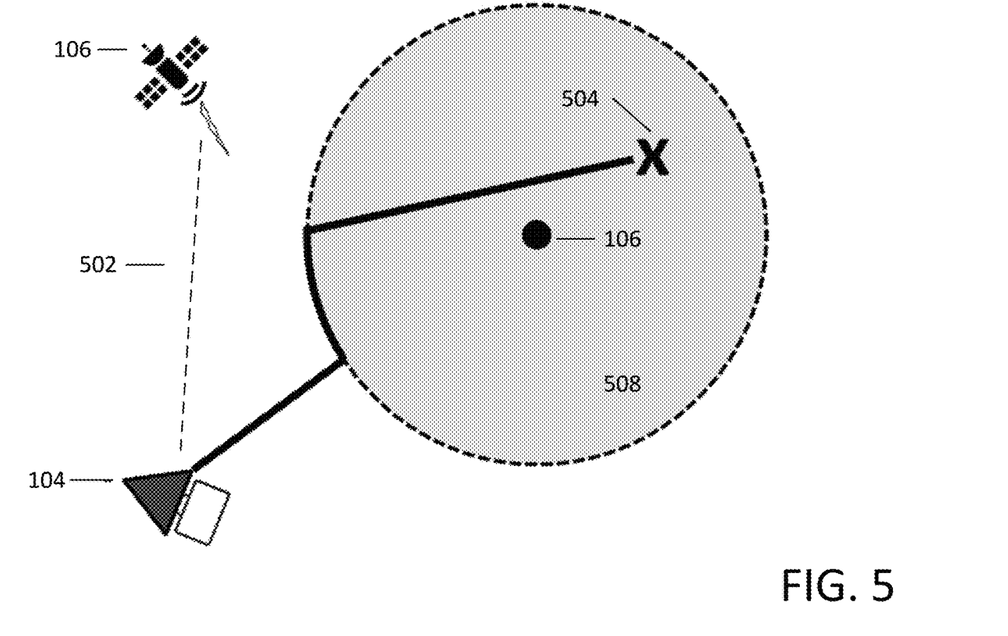
FIG. 5 illustrates an example path taken by an object in the system of the present disclosure.

The remote controlled vehicle system 100 can also be used for remote delivery of a generic payload, including medicines, antibiotics, food, etc., into a jamming zone. FIG. 5 depicts a use case of system 100 in one such manner. In one embodiment, the object 104 will proceed in a similar manner to that described regarding FIG. 3. In this embodiment the navigation data 502 includes instructions to deliver a payload to a destination coordinate 504. The embodiment as disclosed in FIG. 5 proceeds in a similar fashion as the embodiment of FIG. 3 until the object 104 reaches destination 504. Instead of merely navigating to this point, the object 104 leaves the payload at the destination coordinate 504 through a payload delivery mechanism contained within or connected to the object 104. Note that while FIG. 5 depicts the object 104 delivering a payload at only one destination coordinate 504, other embodiments of the present disclosure allow for the delivery of payloads to multiple locations.

Figure 6:
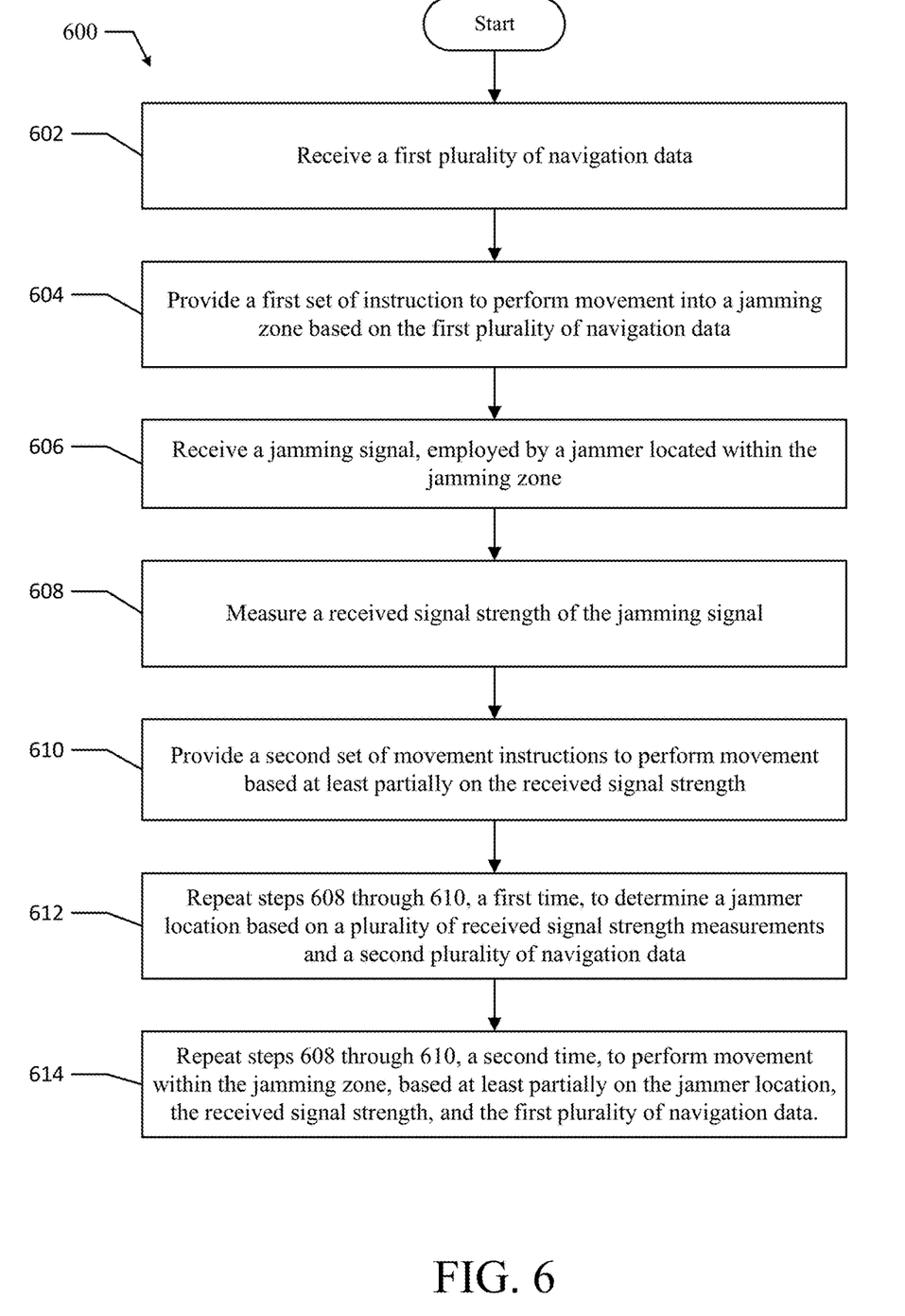
FIG. 6 illustrates an example embodiment of a method of the present disclosure.

FIG. 6 illustrates an example embodiment of a method 600 of the presently disclosed method, as was discussed above in relation to the system 100. The method 600 may be implemented in system, such as the system 100, or on a CPU. For example, the method may be implemented by the object 104, the SNR analyzer 132, the navigation system 114, the navigation support system 116, the signal receivers 120A-B, the movement generators 122A-B, the CPUs 124A-B, the jammer locator 128, or the position estimator 130. The method 600 may also be implemented by a set of instructions stored on a computer readable medium that, when executed by a processor, cause the computer system to perform the method. For example, all or part of the method 600 may be implemented by the CPU 124B and memory 126B. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

Step 602 includes receiving a first plurality navigation data 302. For example, the first plurality of navigation data 302 may include the vehicle's 104 current position and an instruction to navigate to a destination coordinate 304. In step 604, a first set of instructions to perform movement into a jamming zone containing a jamming signal 308 is provided based at least on the first plurality of navigation data 302. Furthermore, in step 606, a jamming signal within the jamming zone 308 is received. This jamming signal 308 is measured, as described above, for the received signal strength in step 608. In step 610, a second set of instructions to perform movement are provided based at least partially on the received signal strength. For example, if the RSS is not yet at a certain threshold, the object 104 will maintain an original path 306 until it reaches a coordinate 312 at which a new instruction for movement will be provided along path 314. At step 612, the two prior steps, 608 and 610, will be performed repeatedly, a first time, to determine a the location of the jammer 106 based on a plurality of received signal strength measurements and a second plurality of navigation data, comprising coordinate data along path 314. Once 612 is complete, as in the location of the jammer 106 has been determined, at step 614, the two earlier steps, 608 and 610, will be performed repeatedly, second time, to perform movement within the jamming zone, based at least partially on the location of the jammer 106, the received signal strength, and the first plurality of navigation data 302.

Figure 7A:
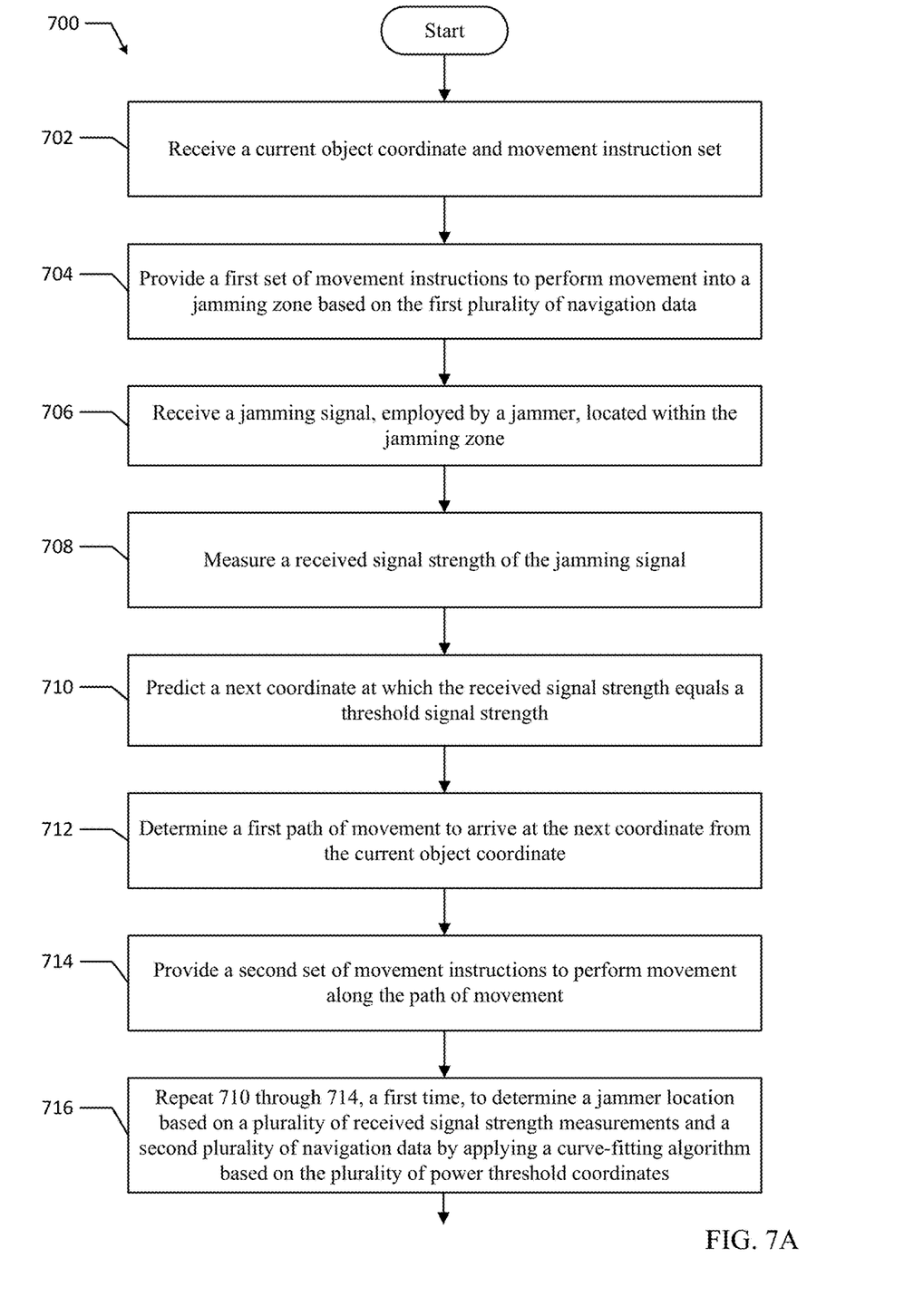
FIGS. 7A and 7B illustrate an example embodiment of a method of the present disclosure.
Figure 7B:
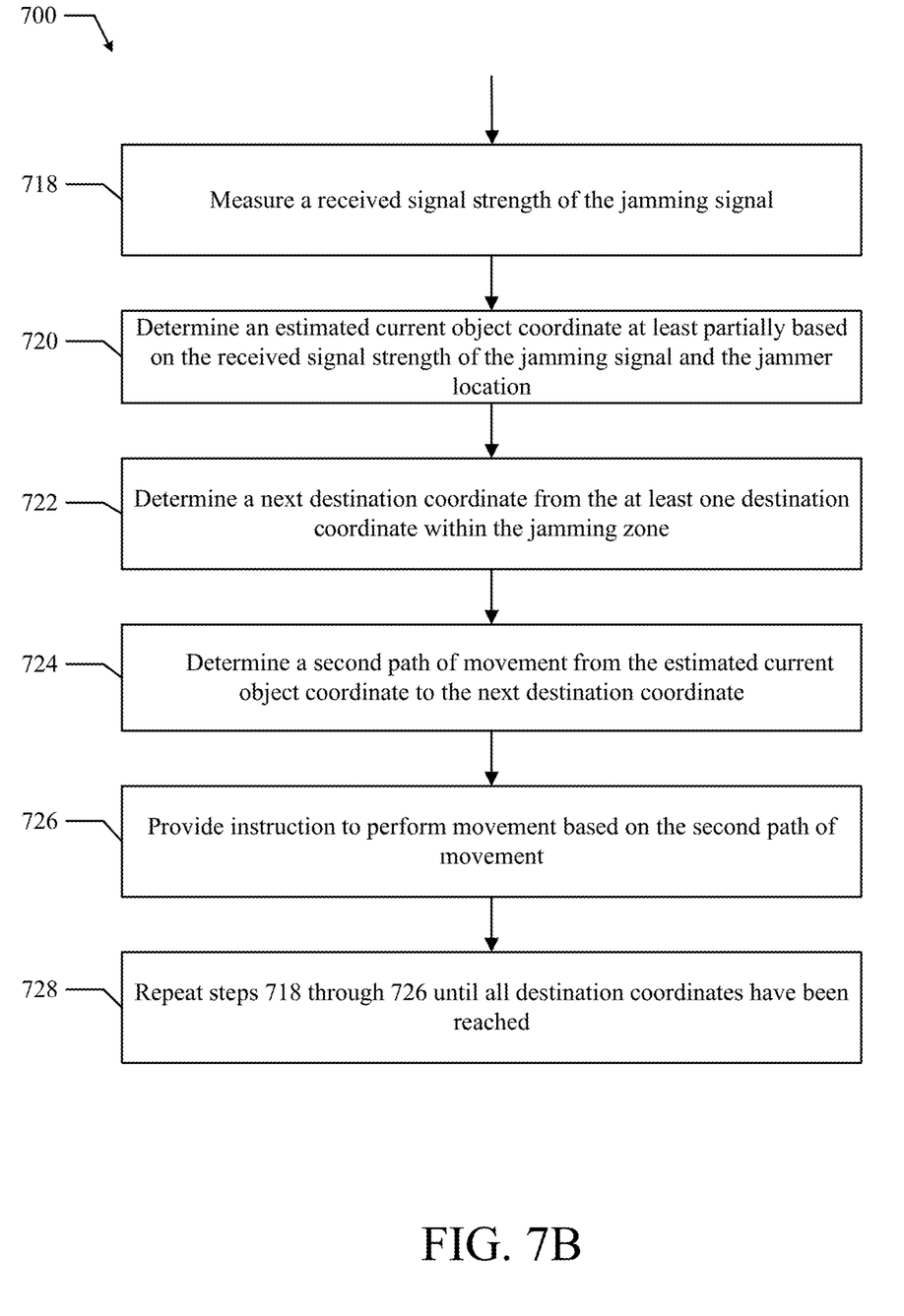

FIGS. 7A and 7B illustrate an example embodiment of a method 700 of the presently disclosed method, as was discussed above in relation to the system 100. The method 700 may be implemented in system, such as the system 100, or on a CPU. For example, the method may be implemented by the object 104, the snr analyzer 132, the navigation system 114, the navigation support system 116, the signal receivers 120A-B, the movement generators 122A-B, the CPUs 124A-B, the jammer locator 128, or the position estimator 130. The method 700 may also be implemented by a set of instructions stored on a computer readable medium that, when executed by a processor, cause the computer system to perform the method. For example, all or part of the method 600 may be implemented by the CPU 124B and memory 126B. Although the examples below are described with reference to the flowchart illustrated in FIGS. 7A and 7B, many other methods of performing the acts associated with FIGS. 7A and 7B may be used. For example, the order of some of the blocks may be changed, certain blocks may be combined with other blocks, one or more of the blocks may be repeated, and some of the blocks described may be optional.

Step 702 indicates the movement generator 122B may receive a current apparatus coordinate and movement instruction set contained in the navigation data 302. In step 704, the movement generator 122B may provide a first set of movement instructions to perform movement into a jamming zone containing a jamming signal 308 based on the first plurality of navigation data 302. As discussed above, the movement generator 122B will simply cause the object 104 to follow an original path 306 if there is no jamming signal 308 present. Once the vehicle enters a zone containing the jamming signal 308, the movement generator 122B, at step 706, Receive a jamming signal 308, employed by a jammer 106, located within the jamming zone. In step 708, the movement generator 122B may measure a received signal strength of the jamming signal 708. At step 710, the movement generator 122B may predict a next coordinate at which the received signal strength of the jamming signal 308 equals a threshold signal strength. For example, if the threshold signal strength has not yet been met, the movement generator 122B may predict the threshold to be met along the original path 306. If the threshold has been met, the movement generator 122B may predict a coordinate nearby, one not located on path 306, at which the RSS may be equal to the threshold value.

Following step 710, the movement generator 122B, at step 712, may then determine a first path of movement 314 to arrive at the next coordinate from the current object coordinate. For example, as seen in FIG. 3, the path 314 may take on a substantially circular shape. At step 714, the movement generator 122B may provide a second set of movement instructions to perform movement along the path of movement 314. Step 716 repeats steps 710 through 714, a first time to determine a jammer 106 location based on a plurality of received signal strength measurements and a second plurality of navigation data by applying a curve-fitting algorithm based on the plurality of power threshold coordinates. For example, as the object 104 moves along the path 314, the movement generator 122B may collect and associate multiple RSS values and corresponding coordinates.

At step 718, once the jammer 106 has been located, the movement generator 122B may again measure a received signal strength of the jamming signal 308. At step 720, the movement generator 122B may determine an estimated current object 104 coordinate at least partially based on the received signal strength of the jamming signal 308 and the jammer 106 location. At step 722, the movement generator may determine a next destination coordinate from the at least one destination coordinate 304 within the jamming zone containing jamming signal 308. At step 724, the movement generator may determine a second path of movement 314 from the estimated current object coordinate to the next destination coordinate 304. At step 726, the movement generator 122B may provide instruction to perform movement based on the second path of movement. Lastly, at step 7280, the movement generator 122B may repeat steps 718 to 726 until all destination coordinates 304 have been reached.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
(A) receiving a first plurality navigation data;

(B) performing movement into a jamming zone based on the first plurality of navigation data;
(C) receiving a jamming signal, employed by a jammer, located within the jamming zone;
(D) measuring a received signal strength of the jamming signal;
(E) performing movement based at least partially on the received signal strength;
(F) repeating steps (D) through (E), a first time, to determine a jammer location based on a plurality of received signal strength measurements and a second plurality of navigation data; and
(G) repeating steps (D) through (E), a second time, to perform movement within the jamming zone, based at least partially on the jammer location, the received signal strength, and the first plurality of navigation data.

2. The method of claim 1, wherein the repeating steps (D) through (E), a second time, occurs after the repeating steps (D) through (E), a first time, has completed.

3. The method of claim 1, wherein the first plurality of navigation data comprises a current object coordinate and a movement instruction set comprising at least one destination coordinate.

4. The method of claim 2, wherein the movement instruction set comprises at least one destination coordinate within the jamming zone.

5. The method of claim 2, wherein performing movement based at least partially on the received signal strength in step (E) comprises:
predicting a next coordinate at which the received signal strength equals a threshold signal strength;
determining a first path of movement to arrive at the next coordinate from the current object coordinate; and
performing movement along the path of movement.

6. The method of claim 3, wherein the second plurality of navigation data comprises a plurality of power threshold coordinates at which the received signal strength was equal to the threshold signal strength.

7. The method of claim 4, wherein the path of movement is substantially circular in shape.

8. The method of claim 5, wherein determining a jammer location based on a plurality of received signal strength measurements and a second plurality of navigation data comprises applying a curve fitting algorithm based on the plurality of power threshold coordinates.

9. The method of claim 7, wherein repeating steps (D) through (E), a second time to perform movement within the jamming zone based at least partially on the jammer location, the received signal strength, and the first plurality of navigation data comprises:
determining an estimated current object coordinate at least partially based on the received signal strength of the jamming signal and the jammer location;
determining a next destination coordinate from the at least one destination coordinate within the jamming zone;
determining a second path of movement from the estimated current object coordinate to the next destination coordinate; and
performing movement based at least partially on the second path of movement.

10. The method of claim 9, wherein the movement instruction set comprises at least two destination coordinates within the jamming zone.

11. The method of claim 10, wherein the flight path comprises instructions to reach each of the at least two destination coordinates only once.

12. The method of claim 8, further comprising determining a current movement speed of the object at least partially based on the jammer location and the received signal strength.

13. The method of claim 8, further comprising depositing a payload at any of the at least one destination coordinates within the jamming zone.

14. A positioning system comprising:
an external data source configured to transmit a first plurality of navigation data;
a jammer configured to transmit a jamming signal within a jamming zone; and
an object comprising:
an antenna configured to:
receive the first plurality of navigation data and the jamming signal; and
relay the first plurality of navigation data and the jamming signal;
a navigation system configured to
receive the first plurality of navigation data from the antenna; and
provide a first set of movement instructions, based on the first plurality of navigation data, into a jamming zone;
a navigation support system configured to:
receive the first plurality of navigation data and the jamming signal;
provide a second set of instructions to perform movement, based at least partially on the received signal strength;
repeat the act of receiving the jamming signal and providing a second set of instructions to perform movement, a first time, to determine a jammer location based on a plurality of received signal strength measurements and a second plurality of navigation data; and
repeat the act of receiving the jamming signal and providing a second set of instructions to perform movement, a second time, within the jamming zone, based at least partially on the jammer location, the received signal strength, and the first plurality of navigation data;
a propulsion system configured to:
receive any of the sets of instructions to perform movement provided by the navigation system and the navigation support system; and
perform movement based on any of the sets of instructions to perform movement.

15. The system of claim 14 wherein the first plurality of navigation data comprises a current object coordinate and a movement instruction set comprising at least one destination coordinate.

16. The method of claim 15 wherein providing a second set of instructions to perform movement comprises:
predicting a next coordinate at which the received signal strength equals a threshold signal strength;
determining a path of movement to arrive at the next coordinate from the current object coordinate; and
providing instruction to perform movement along the path of movement.

17. The method of claim 16 wherein the second plurality of navigation data comprises a plurality of power threshold coordinates at which the received signal strength was equal to the threshold signal strength.

18. The method of claim 17 wherein the path of movement is substantially circular in shape.

19. The method of claim 18 wherein the act to determine a jammer location based on a plurality of received signal strength measurements and a second plurality of navigation data comprises using the plurality of power threshold coordinates as inputs to a curve fitting algorithm.

20. A non-transitory, computer-readable medium storing instructions which, when performed by a processor, cause the processor to:
- (A) receive a first plurality navigation data;
- (B) provide a first set of movement instructions to perform movement into a jamming zone based on the first plurality of navigation data;
- (C) receive a jamming signal employed by a jammer, located within the jamming zone;
- (D) measure a received signal strength of the jamming signal;
- (E) provide a second set of movement instructions to perform movement based at least partially on the received signal strength;
- (F) repeat steps (D) through (E), a first time, to determine a jammer location based on a plurality of received signal strength measurements and a second plurality of navigation data; and
- (G) repeat steps (D) through (E), a second time, to provide a second set of movement instructions to perform movement within the jamming zone, based at least partially on the jammer location, the received signal strength, and the first plurality of navigation data.

* * * * *